US012420208B2

(12) United States Patent
Ironmonger et al.

(10) Patent No.: US 12,420,208 B2
(45) Date of Patent: Sep. 23, 2025

(54) INPUT APPARATUS FOR A GAMES CONSOLE (71) Applicant: Ironburg Inventions Limited, Wincanton (GB)

(72) Inventors: Duncan Ironmonger, Milton, GA (US); Carl Jeffrey, Cheltenham (GB); Sunil Daddar, Suwanee, GA (US)

(*) Notice: Subject to any disclaimer, the term of this patent is extended or adjusted under 35 U.S.C. 154(b) by 387 days.

(21) Appl. No.: 18/002,347

(22) PCT Filed: Jun. 19, 2020

(86) PCT No.: PCT/IB2020/000570
§ 371 (c)(1),
(2) Date: Dec. 19, 2022

(87) PCT Pub. No.: WO2021/255489
PCT Pub. Date: Dec. 23, 2021

(65) Prior Publication Data
US 2023/0233948 A1 Jul. 27, 2023

(51) Int. Cl.
*A63F 13/98* (2014.01)
*A63F 13/24* (2014.01)

(52) U.S. Cl.
CPC .............. *A63F 13/98* (2014.09); *A63F 13/24* (2014.09)

(58) Field of Classification Search
CPC .......... A63F 13/98; A63F 13/24; A63F 13/22
See application file for complete search history.

(56) References Cited

U.S. PATENT DOCUMENTS

| 4,032,728 | A | 6/1977 | Oelsch |
| 5,430,262 | A | 7/1995 | Matsui et al. |
| 5,451,053 | A | 9/1995 | Garrido |

(Continued)

FOREIGN PATENT DOCUMENTS

| CN | 202528096 | 11/2012 |
| CN | 203077157 | 7/2013 |

(Continued)

OTHER PUBLICATIONS

Sean Buckley: "Mad Catz MLG Pro Circuit controller review (PS3)," https://www.engadget.com/2012/01/29/mad-catz-mlg-pro-circuit-controller-review-ps3/ (Jan. 29, 2012).

(Continued)

*Primary Examiner* — Peter J Iannuzzi
(74) *Attorney, Agent, or Firm* — Walters & Wasylyna LLC (57) ABSTRACT

The invention provides an improved controller (10) for a games console. The invention is a games controller (10) that is intended to be held by a user in both hands in the same manner as a conventional controller (1). Additionally, the controller of the invention (10) may comprise the same controls (2, 3, 4, 5, 6, 7, 8, 9) as a conventional controller (1). The controller of the present invention (10) is advantageous as it additionally comprises four additional controls (11 A, 11 B, 11C, 11 D) located on the rear of the controller (10) in a position to be operated by the middle fingers of a user (12). The additional controllers (11 A, 11 B, 11C, 11 D) may be paddle levers and may replicate the functions of one or more of the controls (2, 3, 4, 5, 6, 7, 8, 9) located on the front or top of the controller (10).

19 Claims, 9 Drawing Sheets

(56) References Cited

U.S. PATENT DOCUMENTS

| | | | |
|---|---|---|---|
| 5,773,769 | A | 6/1998 | Raymond |
| 5,841,372 | A | 11/1998 | Matsumoto |
| 5,874,906 | A | 2/1999 | Willner et al. |
| 5,989,123 | A | 11/1999 | Tosaki et al. |
| 6,203,432 | B1 | 3/2001 | Roberts et al. |
| 6,251,015 | B1 | 6/2001 | Caprai |
| 6,512,511 | B2 | 1/2003 | Willner et al. |
| 6,752,719 | B2 | 6/2004 | Himoto et al. |
| 6,760,013 | B2 | 7/2004 | Willner et al. |
| 7,510,477 | B2 | 3/2009 | Argentar |
| 7,758,424 | B2 | 7/2010 | Riggs et al. |
| 7,859,514 | B1 | 12/2010 | Park |
| 8,641,525 | B2 | 2/2014 | Burgess et al. |
| 8,777,620 | B1 | 7/2014 | Baxter |
| 9,089,770 | B2 | 7/2015 | Burgess et al. |
| 9,804,691 | B1 | 10/2017 | Strahle et al. |
| 2001/0003713 | A1 | 6/2001 | Willner et al. |
| 2001/0025778 | A1 | 10/2001 | Ono |
| 2002/0052237 | A1 | 5/2002 | Magill |
| 2002/0128064 | A1 | 9/2002 | Sobota |
| 2003/0067111 | A1 | 4/2003 | Swan |
| 2004/0259059 | A1 | 12/2004 | Aoki |
| 2005/0083297 | A1 | 4/2005 | Duncan |
| 2005/0255915 | A1 | 11/2005 | Riggs et al. |
| 2005/0255918 | A1 | 11/2005 | Riggs et al. |
| 2006/0025217 | A1 | 2/2006 | Hussaini et al. |
| 2006/0116204 | A1 | 6/2006 | Chen et al. |
| 2008/0261695 | A1 | 10/2008 | Coe |
| 2009/0088250 | A1 | 4/2009 | Carlson |
| 2009/0258705 | A1 | 10/2009 | Guinchard |
| 2010/0073283 | A1 | 3/2010 | Enright |
| 2010/0267454 | A1 | 10/2010 | Navid |
| 2010/0304865 | A1 | 12/2010 | Picunko |
| 2011/0256930 | A1 | 10/2011 | Jaouen |
| 2011/0281649 | A1 | 11/2011 | Jaouen |
| 2012/0088582 | A1 | 4/2012 | Wu et al. |
| 2012/0142417 | A1 | 6/2012 | Haswell et al. |
| 2012/0142418 | A1 | 6/2012 | Muramatsu |
| 2012/0142419 | A1 | 6/2012 | Muramatsu |
| 2012/0299244 | A1 | 11/2012 | Rice et al. |
| 2012/0322553 | A1 | 12/2012 | Burgess et al. |
| 2012/0322555 | A1 | 12/2012 | Burgess et al. |
| 2013/0147610 | A1 | 6/2013 | Grant et al. |
| 2013/0150155 | A1 | 6/2013 | Barney et al. |
| 2013/0196770 | A1 | 8/2013 | Barney et al. |
| 2014/0274397 | A1 | 9/2014 | Sebastian |
| 2015/0234479 | A1 | 8/2015 | Schantz et al. |
| 2015/0238855 | A1 | 8/2015 | Uy et al. |
| 2016/0082349 | A1 | 3/2016 | Burgess et al. |
| 2016/0193529 | A1 | 7/2016 | Burgess et al. |
| 2016/0346682 | A1 | 12/2016 | Burgess et al. |
| 2017/0001107 | A1 | 1/2017 | Burgess et al. |
| 2017/0001108 | A1 | 1/2017 | Burgess et al. |
| 2017/0087456 | A1 | 3/2017 | Burgess et al. |
| 2017/0151494 | A1 | 6/2017 | Ironmonger et al. |
| 2017/0157509 | A1 | 6/2017 | Burgess et al. |
| 2019/0083883 | A1* | 3/2019 | Gassoway ............. A63F 13/245 |

FOREIGN PATENT DOCUMENTS

| | | |
|---|---|---|
| DE | 202006003631 | 7/2007 |
| EP | 1078660 | 2/2001 |
| EP | 1140303 | 10/2001 |
| EP | 1 208 883 | 5/2002 |
| EP | 1 852 162 | 11/2007 |
| EP | 2440438 | 4/2012 |
| EP | 2 479 636 | 7/2012 |
| EP | 2 698 185 | 2/2015 |
| EP | 2 908 224 | 8/2015 |
| GB | 2 204 387 | 11/1988 |
| GB | 2 244 546 | 12/1991 |
| GB | 2 481 633 | 1/2012 |
| JP | H1020951 | 1/1998 |
| JP | 2001-84077 | 3/2001 |
| WO | WO 02/34345 | 5/2002 |
| WO | WO 03/046822 | 6/2003 |
| WO | WO 2005/103869 | 11/2005 |
| WO | WO 2007/040499 | 4/2007 |
| WO | WO 2008/131249 | 10/2008 |
| WO | WO 2012/036710 | 3/2012 |
| WO | WO 2014/187923 | 11/2014 |
| WO | WO 2015/004261 | 1/2015 |
| WO | WO 2015/078990 | 6/2015 |
| WO | WO 2015/110553 | 7/2015 |
| WO | WO 2015/173269 | 11/2015 |
| WO | WO 2016/176010 | 11/2016 |
| WO | WO 2018/0167464 | 9/2018 |

OTHER PUBLICATIONS

Joe Robinson: "Mad Catz MLG Pro Circuit Controller Review," GameWatcher, Editorials, https: www.gamewatcher.co/editorials/mad-catz-mlg-pro-circuit-controller-review/11890# (Apr. 18, 2012).
Driph.com/words: "Mad Catz MLG Pro Circuit Controller review & comparison," https://driph.com/words/2012/01/mad-catz-mlq-pro-circuit-controller-review-comparison/ (Jan. 20, 2012).
Wikipedia: "Nintendo 64 accessories," https://en.wikipedia.org/w/index.php?title=Nintendo_64_accessories+oldid=784405317.
Wikipedia: "Rumble Pak," https://en.wikipedia.org/w/index.php?title=Rumble Pak +oldid=768546573.
Nick Statt: "Scuf's new PS4 Controller adds wireless play and new customizable side buttons," The Verge, circuit breaker, https://www.theverge.com/circuitbreaker/2018/5/22/17378730/souf-gaming-vantage-ps4-pro-controller-wireless-sax-buttons-customizable (May 22, 2018).
Wikipedia: "List of Nintendo DS accessories," https://en.wikipedia.org/w/index.php?title=List_of_Nintendo_DS_accessories+oldid=768095407.
International Searching Authority: International Search Report and Written Opinion, App. No. PCT/IB2020/000570 (Feb. 24, 2021).
Burns: "Review: Scuf Xbox 360 Controller," Xboxer360.com (2010).
"Rapid Fire Mod for Wireless Xbox 360 Controller," forum on xbox-scene.com (2008).
"Thrustmaster USB game controller roundup," dansdata.com/tmsticks.htm (2002).
Olin Coles: "Thrustmaster Run-N-Drive PC/PS3 Wireless Gamepad," BenchmarkReviews.com (2009).
Xbox 360 Wireless Controller Tour, published on May 13, 2005 at http://www.ign.com/articles/2005/05/13/xbox-360-wireless-controller-tour.

* cited by examiner

INPUT APPARATUS FOR A GAMES CONSOLE

This application is the U.S. national phase entry of Intl. App. No. PCT/IB2020/000570 filed on Jun. 19, 2020. The entire contents of Intl. App. No. PCT/IB2020/000570 are incorporated herein by reference.

TECHNICAL FIELD

The present invention relates to an input apparatus for a computer, such as, but not limited to, a games console, more particularly, but not exclusively the invention relates to, a hand held controller for a controlling a game device or software application.

BACKGROUND

Controllers for most current games consoles are generally intended to be held and operated by the user holding the controller in both hands, such controllers are sometime referred to as "gamepads". A conventional controller will generally comprise a hard outer case with a plurality of controls mounted about the controller. Typically the controls include buttons, analogue control sticks, bumpers and triggers and are provided upon the front or the top of the controller.

An object of the present invention is to provide a controller having at least one control mounted to the rear or back of the controller. It is desirable that the control is detachable, a further object is to provide an improved attachment mechanism and/or that the control or controls can be mounted in a variety of positions, orientations, arrangements or configurations.

The present invention seeks to overcome or at least mitigate the problems of the prior art.

SUMMARY

A first aspect of the present invention provides an input apparatus for a computer or controller for a games console having one or more detachably mounted control members, the one or more control members comprising a first part of an attachment system for mating with a second part of an attachment system provided on a panel forming a portion of an outer case of the apparatus.

Optionally, the one or more control members comprise a major control member and a minor control member.

Optionally, the major control member and the minor control member are configured to nest or tessellate with each other.

Optionally, the major control member and the minor control member may overlap in a longitudinal direction of the apparatus.

Optionally, the major control member may comprise a first end edge and the minor control member may comprise a second end edge, the second end edge may be complementary in shape to the first end edge.

Optionally, the input apparatus comprises a plurality of mounting locations on the panel forming a portion of an outer case, each mounting location comprises a second part of the attachment system.

Optionally, the major control member is mountable in any one of the plurality of mounting locations.

Optionally, the minor control member is mountable in any one of the plurality of mounting locations.

Optionally, one or more control members are mounted to the input apparatus in pairs.

Optionally, a first one of the pair is a major control member and a second one of the pair is a minor control member.

Optionally, the one or more control members comprises a first pair of control members mounted to the apparatus on a first side of a rear panel, adjacent to one of a pair of handles disposed on opposing sides of the rear panel, in which the pair control members are in a first orientation.

Optionally, the one or more control members comprises a second pair of control members mounted to the apparatus on a second side of a rear panel, adjacent to the other one of the pair of handles, the second pair control members being in a first orientation.

Optionally, the first pair of control members is mountable to the apparatus on a second side of the rear panel, adjacent to the other one of the pair of handles in a second orientation, wherein the second orientation is inverted with respect to the first orientation.

Optionally, the second pair of control members is mountable to the apparatus on the first side of the rear panel, the second pair control members being in a second orientation, wherein the second orientation is inverted with respect to the first orientation.

Optionally, each control member comprises an outer surface with which a user interacts or engages, a portion of the outer surface provides a reduced interaction region of the outer surface of each control member is shaped and configured to reduce the likelihood of user interaction, said portion of the surface is set back with respect to an adjacent portion of the outer surface of the control member so as to be closer to a rear panel of the apparatus than the adjacent portion.

A second aspect of the present invention provides an input apparatus for a computer or controller for a games console having two or more detachably mounted control members, each of the two or more control members comprising a first part of an attachment system for mating with a second part of an attachment system provided on a panel forming a portion of an outer case of the controller, the two or more control members comprising a major control member and a minor control member, the major control member and the minor control member are configured to nest with each other.

Optionally, the major control member and the minor control member are mountable to the apparatus on a first side of a rear panel, adjacent to a first one of a pair of handles disposed on opposing sides of the rear panel, the major control member and the minor control member being in a first orientation.

Optionally, the major control member and the minor control member are mountable to the apparatus on a second side of the rear panel, adjacent to the other one of the pair of handles in a second orientation, wherein the second orientation is inverted with respect to the first orientation.

A third aspect of the present invention provides an input apparatus for a computer or controller for a games console having two or more detachably mounted control members, each of the two or more control members comprising a first part of an attachment system for mating with a second part of an attachment system provided on a panel forming a portion of an outer case of the controller, the two or more control members comprising a major control member and a minor control member, the apparatus comprising a pair of handles disposed on opposing sides of the rear panel, the major control member and the minor control member are configured to be mounted to the apparatus in one of a pair of configurations, the pair of configurations comprising;

a first configuration in which the major control member and the minor control member are mounted to the apparatus on a first side of the rear panel, adjacent to a first one of the pair of handles, the major control member and the minor control member being in a first orientation, a second configuration in which the major control member and the minor control member are mounted to the apparatus on a second side of the rear panel, adjacent to the other one of the pair of handles in a second orientation, wherein the second orientation is inverted with respect to the first orientation.

A fourth aspect of the present invention provides an input apparatus for a computer or controller for a games console having two or more detachably mounted control members, each of the two or more control members comprising a first part of an attachment system for mating with a second part of an attachment system provided on a panel forming a portion of an outer case of the controller, the two or more control members comprising a major control member and a minor control member, the major control member and the minor control member are configured to tessellate with each other.

Optionally, the major control member and the minor control member overlap in a longitudinal direction of the apparatus.

Optionally, the major control member comprises a first end edge and the minor control member comprises a second end edge, the second end edge may be complementary in shape to the first end edge.

A fifth aspect of the present invention provides a control member for detachable mounting to input apparatus for a computer, the input apparatus comprising an outer case, the control member comprising a first part of an attachment system for mating with a second part of an attachment system provided on the outer case of the input apparatus, the control member configured to nest with another control detachable control member.

A sixth aspect of the present invention provides a control member for detachable mounting to input apparatus for a computer, the input apparatus comprising an outer case, the outer case comprising a rear panel having a plurality of mounting locations for receiving the control member, the control member comprising a first part of an attachment system for mating with a second part of the attachment system, each of plurality of mounting locations on the outer case of the input apparatus having a second part of the attachment system, the control member configured to be mountable in any one of the plurality of mounting locations.

Optionally, the outer case comprises a pair of handles disposed on opposing side of the rear panel and each of the plurality of mounting locations is disposed adjacent to one of the pair of handles.

Optionally, the input apparatus is a hand held controller for a games console and further comprises:

an outer case;

a plurality of controls located on a front face and top face of the controller;

the controller being shaped to be held in both hands of a user such that the user's thumbs are positioned to operate controls located on the front face of the controller and the user's index fingers are positioned to operate controls located on the top face of the controller; wherein the controller further comprises a rear face for receiving at least one additional control member located and arranged such that the at least one additional control member is in a position operable by the middle finger of a user.

Further features and advantages of the present invention will be apparent from the specific embodiments illustrated in the drawings and discussed below.

Within the scope of this application it is envisaged and intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements may be in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

BRIEF DESCRIPTION OF THE DRAWINGS

Exemplary embodiments of the invention will now be described with reference to the accompanying drawings, in which:

FIG. 5A shows plan views of from above of additional control components for attachment to the rear of the input apparatus of FIGS. 1A to 3A;

DETAILED DESCRIPTION

Figure 1A:
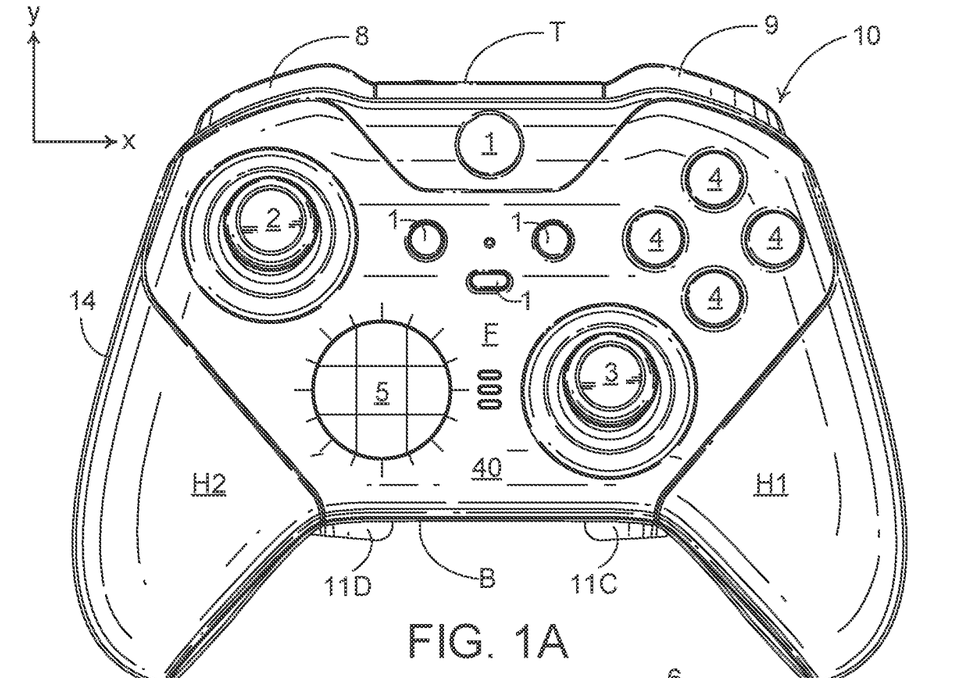
FIG. 1A is a plan view from above of the front of an input apparatus for a games console controller according to an embodiment of the present disclosure.

Detailed descriptions of specific embodiments of an input apparatus, a controller, an additional control component and a method are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the input apparatus, the controller, the additional control component and the method described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention Referring to FIG. 1A there is shown a plan view from above of the front of an input apparatus 10 for a use with a computer. The input apparatus 10 illustrated takes the form of a controller 10 or game pad 10 for use with a video games console or similar. In other embodiments the input apparatus 10 may take the form of a handheld games console or other mobile device such as but not limited to a smartphone, tablet computer, phablet or the input apparatus 10 may be an accessory device (such as, but not limited to, a sleeve or case) for use with such a mobile device.

The apparatus or controller 10 comprises an outer case or shell 14. The case 14 may comprise one or more panels fitted together and or mounted to a chassis member. The case 14 may comprise a front body panel 40 and a rear body panel 42 (see FIG. 1B). The outer case 14 comprises a void in which electronic components (such as, but not limited to, switches and/or sensors) are located.

The apparatus or controller 10 comprises a plurality of controls which are mounted to the front F and to the top T of the controller 10. As used herein the term "front" refers to an upper surface of the controller 10 when in normal use held in both hands, whilst the term "top" refers to a leading edge of the controller 10 which typically faces away from a user when held in both hands. A rear or back of the controller opposes the "front" and typically will form a lower surface, whilst the term "bottom" refers to a trailing edge of the controller 10 which typically faces towards the user when held in both hands. The controller 10 comprises a plurality of buttons which when activated initiate a specific action or control function. The controller 10 comprises at least one omnidirectional control stick or button which is operable to provide directional input.

Specifically, in the illustrated example shown, the controller 10 comprises first, left, and second, right, analogue control sticks, also known as thumb sticks 2, 3. The first left 2 and second right 3 thumb sticks normally control movement and are intended to be operated by the user's left and right thumbs respectively. Left and right thumb sticks 2, 3 are mounted to the front face F of the controller 10. The left thumb stick 2 is located in a forward (or upper i.e. nearer the top face T of the controller 10) left region of the front face F; and right thumb stick 3 is located in a rearward (or lower i.e. nearer the bottom face B of the controller 10) right region of the front face F. There are four buttons 4, located on a forward (or upper i.e. nearer the top face T of the controller 10) right portion of the front face F of the controller 10. The four buttons 4 normally control additional actions and are intended to be operated by the user's right thumb. There is a direction pad 5 located on the rearward (or lower) left portion of the front face F of the controller 10. The direction pad 5 is intended to be operated by the user's left thumb, typically either as an alternative to the left thumb stick 2 or to provide additional action controls. A left shoulder button or bumper 8 and a right shoulder button or bumper 9 are located on the top face T of the controller 10. A left trigger 6 and a right trigger 7 are also located on the top face T of the controller 10 (see FIG. 1B) below a respective one of the left and right shoulder buttons 8, 9. The left and right triggers 6, 7 are typically operated by a user's index fingers. The left and right bumpers 8, 9 may also be operated by a user's index fingers. The left and right triggers 6, 7 may be analogue in nature, or may comprise a plurality of discrete digital states, that is to say the input control may be dependent upon the degree of depression or displacement of the trigger body.

The controller 10 may comprise one or more additional input buttons 1, the buttons 1 may take the form of one or more digital or analogue buttons, or may be in the form of a touch pad or touch screen.

In order to operate any of the buttons 4 a user will normally remove their right thumb from the right thumb stick 3 so as to depress one or more of the buttons 4. Switching between the right thumb stick 3 and the buttons 4 takes time since the user's thumb must traverse the distance therebetween. This may also cause a loss of, or reduction in, control in some games because the user has to relinquish control over the right thumb stick 3 in order to control the buttons 4. This may be a particular problem in games where the right thumb stick 3 is used for aiming. A similar problem may arise in games where the direction pad 5 provides additional actions and the user has to remove their left thumb from the left thumb stick 2 in order to operate the direction pad 5.

In light of the above, the present disclosure provides an improved controller which removes the requirement for a user to remove their thumb from the left or right thumb stick 2, 3 in order to operate additional actions controlled by the four buttons 4 and/or the direction pad 5.

Figure 1B:
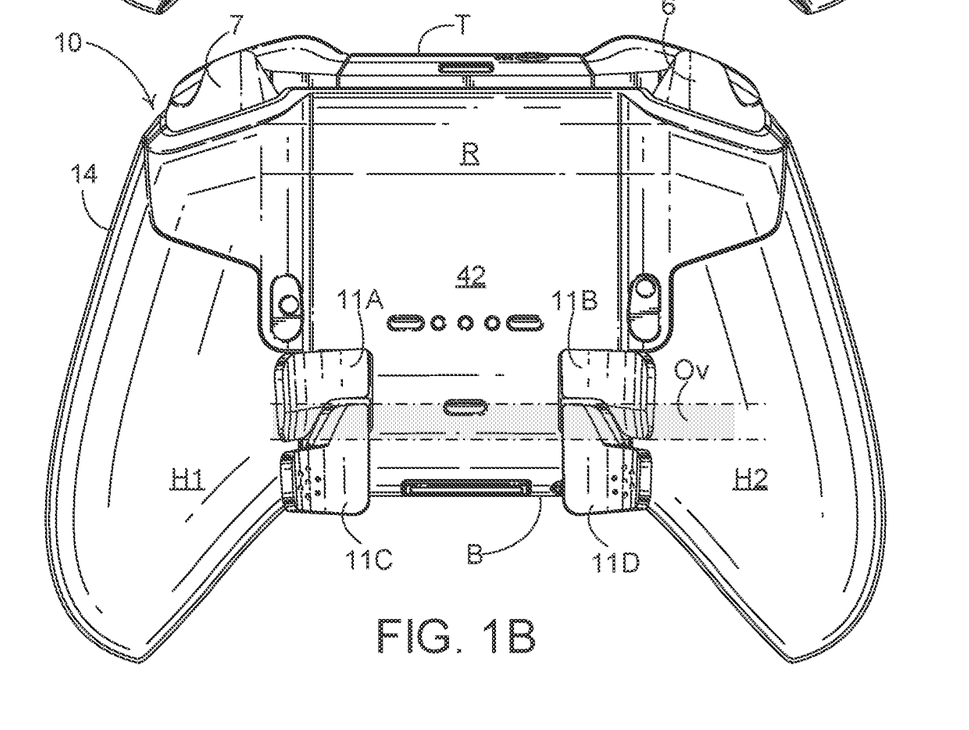
FIG. 1B is a plan view from below of the rear of the input apparatus of FIG. 1, the apparatus comprising additional controls mounted thereto in a first configuration.

The rear of the apparatus 10 according to an embodiment of the present disclosure is illustrated in FIG. 1B.

The apparatus 10 comprises one or more additional controls 11A, 11B, 11C, 11D mounted to the rear R or back of the apparatus 10, where the rear R or back face is opposite the top face F (the face F to which the buttons 4, left and right thumb sticks 2, 3 and direction pad 5 are mounted).

In the illustrated apparatus 10, the apparatus 10 comprises four additional controls 11A, 11B, 11C, 11D. In other embodiments, more or fewer additional controls 11A, 11B, 11C, 11D may be provided. The additional controls 11A, 11B, 11C, 11D, also referred to herein as paddles or paddle levers, and are detachable from the apparatus 10.

The additional controls 11A, 11B, 11C, 11D each comprise a control member mountable to the apparatus 10 for actuating or activating a switch mechanism mounted therein.

A switch mechanism (not shown) is mounted within the apparatus 10 in vertical registry with a portion of each additional control 11A, 11B, 11C, 11D. A portion of the switch mechanism may extend through the body of the apparatus and be disposed in close proximity to, or in contact with, an innermost surface of the additional control 11A, 11B, 11C, 11D. Alternatively, the switch mechanism may be flush or recessed with respect to the outer surface of the rear panel 42. The rear panel 42 is disposed between a pair of handles H1, H2.

The rear body panel 42 comprise a plurality of apertures which are configured and arranged to be in vertical registry with a portion of a respective one of the additional controls 11A, 11B, 11C, 11D. The apertures A enable the respective additional controls 11A, 11B, 11C, 11D to engage with a switch mechanism mounted within the apparatus 10. The switches are coupled to control electronics and enable the apparatus 10 to sense depression or displacement of the additional control 11A, 11B, 11C, 11D.

Each control member 11A, 11B, 11C, 11D comprises a mounting bracket or leg 28 attached to or at first end of a main body 20A, 20B, 20C, 20D. The apparatus 10 comprises a pair of major control members 11C, 11D and a pair of minor control members 11A, 11B, A wing or lobe 22 extends from a second end of the main body 20C, 20D of the major control members 11C, 11D, the second end opposes the first end. The main body 20A, 20B, 20C, 20D and the wing 22 define a cutaway or recess R1, R2.

A wing or lobe 29 extends from a side of the main body 20C, 20D of the minor control members 11A, 11B, the side is disposed adjacent to the first end. The main body 20A, 20B and the lobe 29 define a cutaway or recess R3, R4.

Figures 3A, 3B, 3C:
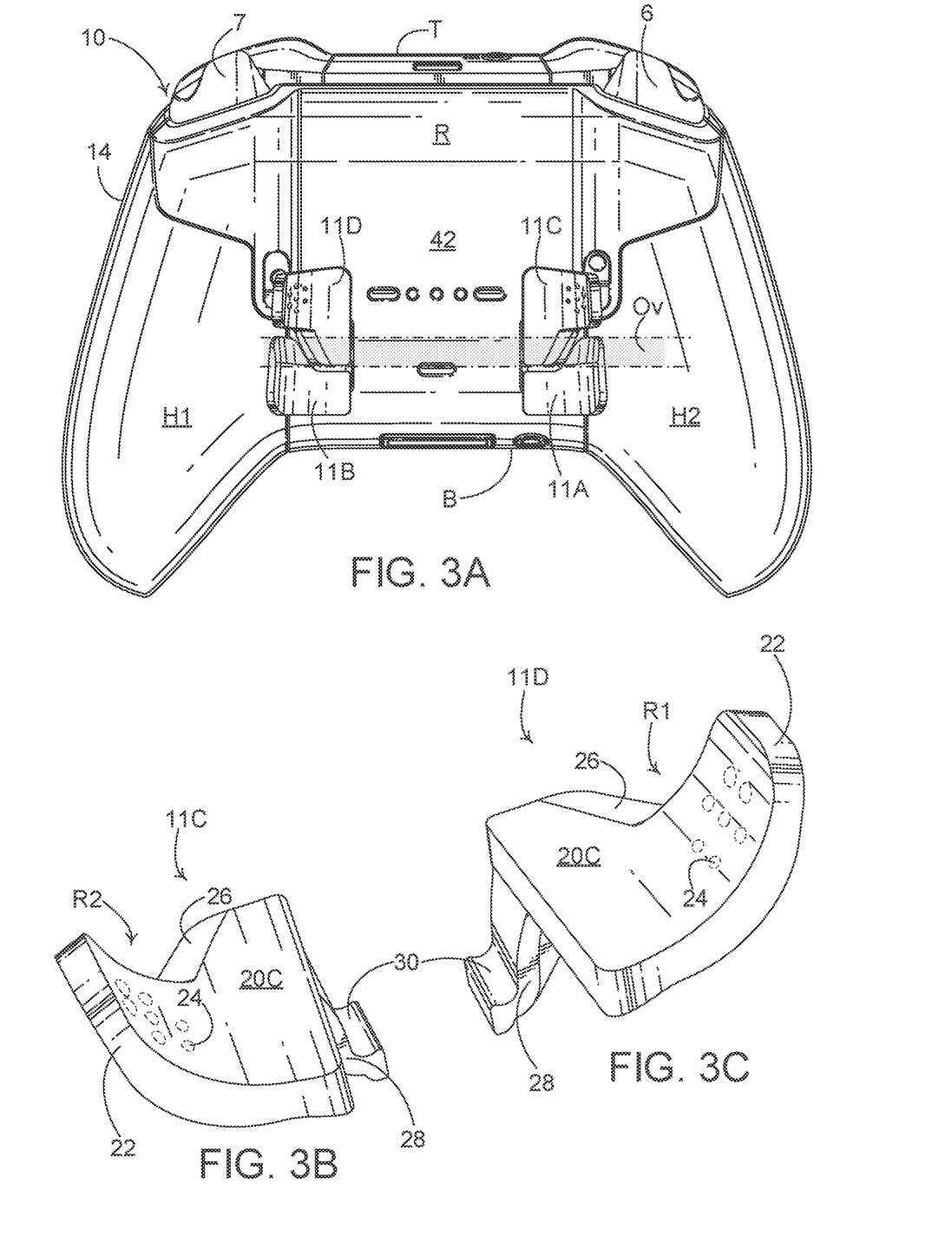
FIG. 3A is a plan view from below of the rear of the input apparatus of FIG. 1, the apparatus comprising additional controls mounted thereto in an alternative configuration.
FIGS. 3B and 3C are perspective views of additional control components for attachment to the rear of the input apparatus of FIGS. 1A to 3A.

Each of the minor control members 11A, 11B is arranged to nest or tessellate with a respective one of the major control members 11C, 11D. The minor control members 11A, 11B partially overlap with the major control members 11C, 11D. An overlapping region is illustrated in FIGS. 1B and 3A.

The minor control members 11A, 11B partially overlap with the major control members 11C, 11D in a longitudinal direction y, extending between the top T and bottom B of the apparatus 10. First minor control member 11A is spaced apart in a transverse direction x, extending between the first and second handles H1, H2, T and bottom B of the apparatus 1,0 from second minor control member 11B. First major control member 11C is spaced apart in the transverse direction x from second major control member 11D.

The lobes 29 of each of the minor control members 11A, 11B are received in one of the recesses R1, R2 of a respective major control member 11C, 11D.

The main body 20C, 20D of each of the major control members 11C, 11D are received in one of the cutaway of R1, R2 of a respective minor control members 11A, 11B.

Optionally, the lobes 29 of the minor control members 11A, 11B are arranged to reduce in thickness compared to the body 20A, 20B. This has the effect of setting the outer surface of the lobes 29 back from that of the body 20A, 20B. In other embodiments this may be achieved by curving or inclining the lobe 29 with respect to the body 20a, 20B.

The lobes 29 of the minor control members 11A, 11B taper or thin as they extend outwardly from body 20A, 20B.

An edge region 26 of the body of the major control members 11C, 11D adjacent to the wings 22 and defining a portion of the recesses R1, R1 is arranged to reduce in thickness compared to the remainder of the body 20C, 20D. This has the effect of setting the outer surface of said region 26 back from that of the body 20C, 20D. In other embodiments this may be achieved by curving or inclining the regions 26 with respect to the body 20A, 20B.

In the illustrated embodiment the lobes 29 and edge regions 26 are chamfered so as to reduce in thickness as the lobe 29 or edge portion 26 approaches the adjacent control member 11A, 11B, 11C, 11D. The lobes 29 and edge regions 26 are located in, or define, at least in part, a region Ov of overlap between major control members 11C, 11D and minor control members 11A, 11B.

In this way portions of the major and minor control members 11A, 11B, 11C, 11D which are adjacent to each other when nested with each other are shaped to mitigate against the user inadvertently actuating the other of the major or minor control members 11A, 11B, 11C, 11D when—simultaneously with—actuating one of the major or minor control members 11A, 11B, 11C, 11D.

Figure 7A:
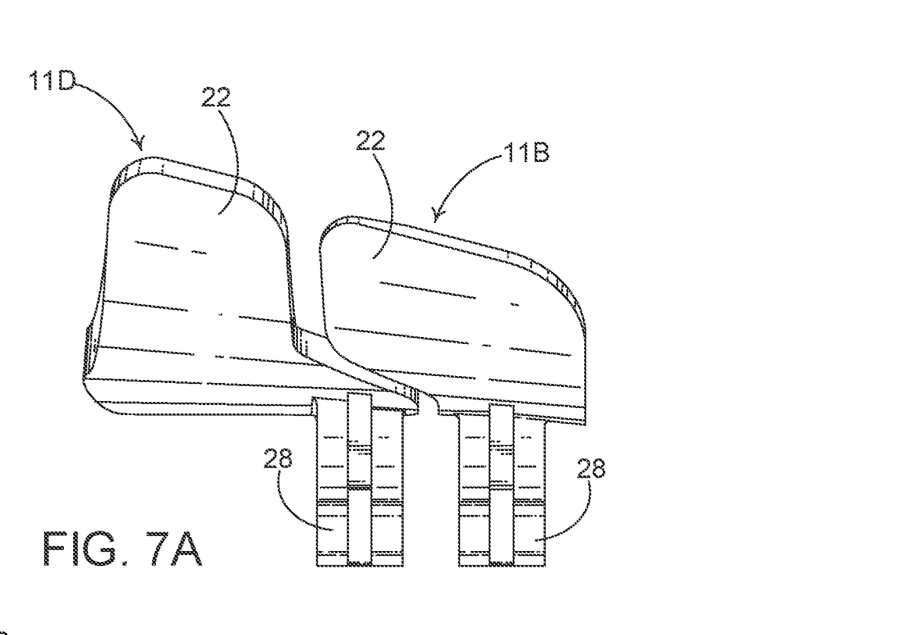
FIG. 7A is side view of a pair additional control components in a nested configuration for attachment to the rear of the input apparatus of FIGS. 1A to 3A.
Figures 7B, 7C:
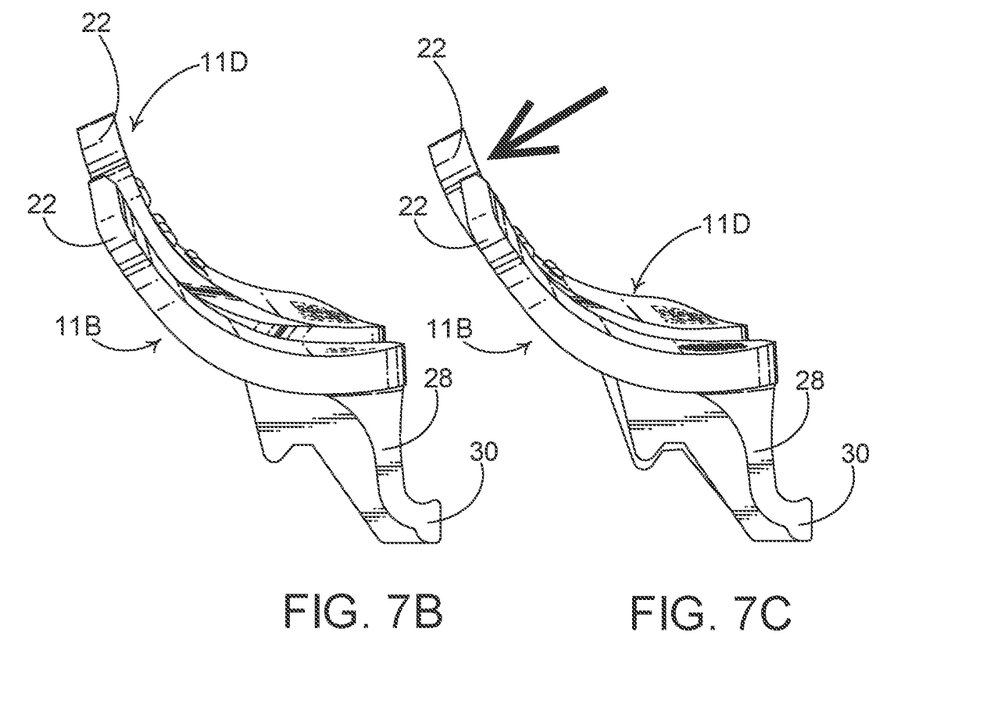
FIG. 7B is perspective view of the pair of nested additional control components of FIG. 7A.
FIG. 7C is perspective view of the pair of nested additional control components of FIG. 7A, in which one of the control components is in an actuated condition.
Figure 8A:
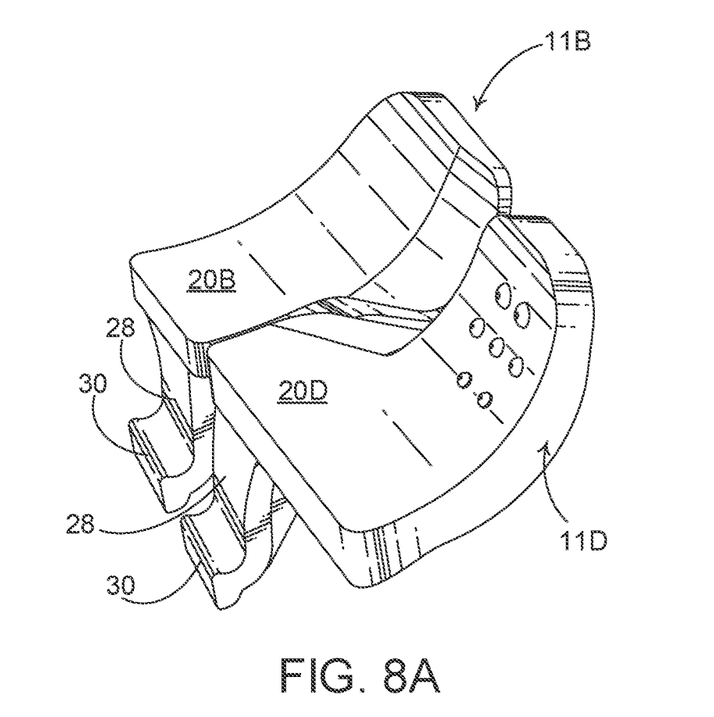
FIGS. 8A and 8B are perspective views of the pair of nested additional control components of FIG. 7A.
Figure 8B:
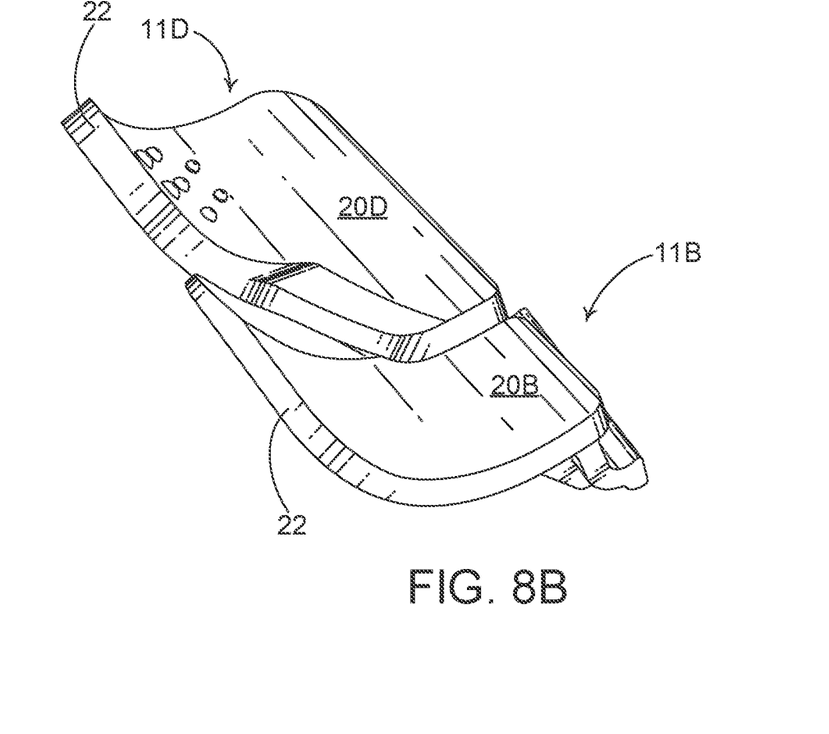
Figure 9A:
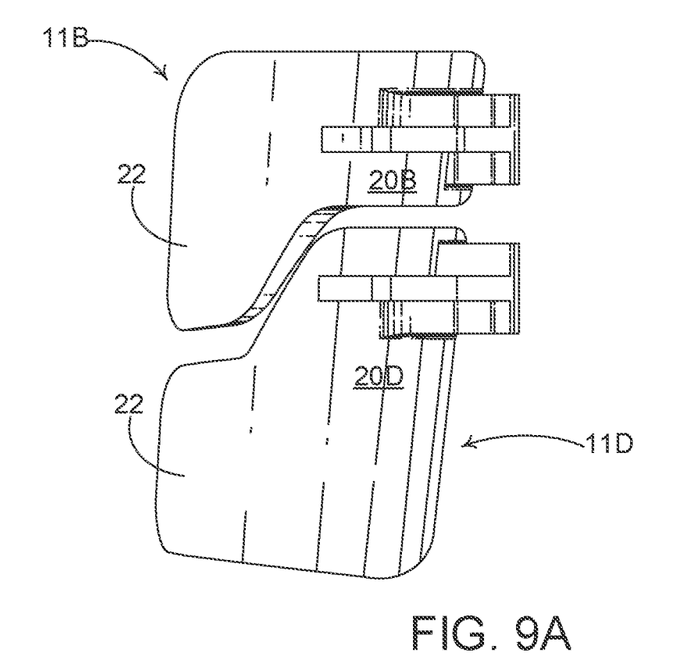
FIG. 9A is a plan view from above of the pair of nested additional control components of FIG. 7A.
Figure 9B:
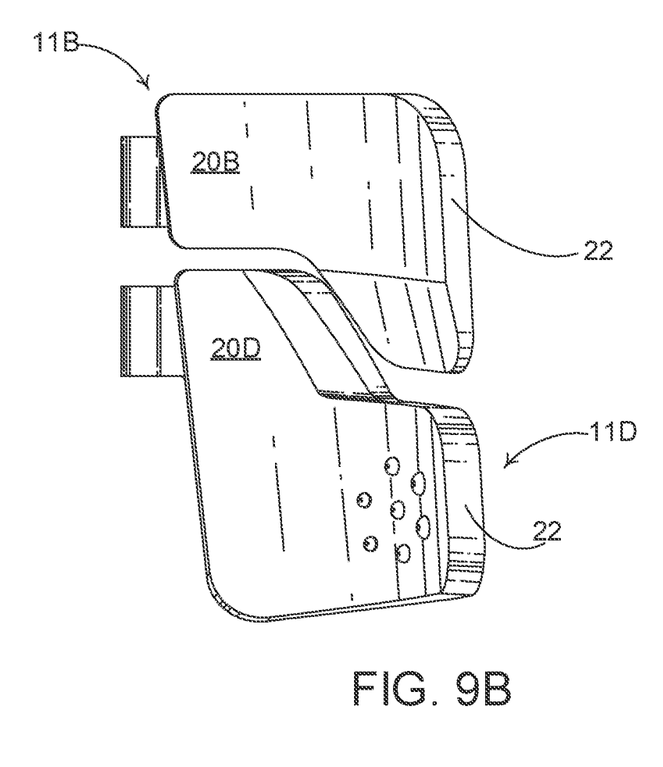
FIG. 9B is a plan view from below of the pair of nested additional control components of FIG. 7A.

The lobes 29 and regions 26 may be arranged such that their outer surfaces do not project beyond the outer surface, or portion thereof, of the adjacent control member 11A, 11B, 11C, 11D when that control member is in an actuated or depressed condition, best shown in FIGS. 7B and 7C. FIG. 7C shows the major control member 11D in an actuated, depressed condition and in FIG. 7B shows the major control member 11D in a rest, inactive condition position. The minor control member 110 is in a rest, inactive, condition position in both FIGS. 7B and 7C. The control members 11A, 11B, 11C, 11D are actuated by pulling an upper portion thereof towards the adjacent one of the pair of handles H1, H2. The control member 11A, 11B, 11C, 11D pivots or rotates slightly with respect to the case 14. In this way the outer surface, the surface facing away from the rear panel 42 of the apparatus 10, of a lobe 29 or region 26 of a first control member 11A, 11B, 11C, 11D which is being engaged or activated by a user may be configured to be flush with, a lobe 29 or region 26 of a second, adjacent, control member 11A, 11B, 11C, 11D not being engaged or activated by the user, when said first control member 11A, 11B, 11C, 11D is in a fully depressed or activated condition and said second control member 11A, 11B, 11C, 11D is in an undepressed, initial, or inactivated condition. In this way when the user depresses the first control member 11A, 11B, 11C, 11D they do not come in to contact with the second control member 11A, 11B, 11C, 11D or at least an adjacent portion thereof.

In some embodiments the lobes 29 and/or regions 26 of the control members 11A, 11B, 11C, 11D may be shaped or configured such that an outer surface of a lobe 29 or region 26 of an inactive control member 11A, 11B, 11C, 11D (an inactive control member 11A, 11B, 11C, 11D is in a rest or start position) is recessed, or set back, with respect to a lobe 29 or region 26 of an active control member 11A, 11B, 11C, 11D (an active control member 11A, 11B, 11C, 11D has been engaged or depressed to actuate a switch mechanism).

The major control members 11C, 11D are substantially equal in length to the minor control members 11A, 11B.

The major control members 11C, 11D and the minor control members 11A, 11B are shaped to diverge away from the rear body panel 42 which is located between first and second handle portions H1, H2 of the controller 10. The major control members 11C, 11D and the minor control members 11A, 11B extend outwardly from the rear body panel 42. The major control members 11C, 11D and the minor control members 11A, 11B extend about portions of side walls of the first and second handle portions H1, H2 so as to be in close proximity thereto. In this way when a user grasps the apparatus 10 by the handle portions H1, H2 the major control members 11C, 11D and the minor control members 11A, 11B are readily accessible with the tips of one or more of the fingers grasping the handle portions H1, H2.

The body 20A, 20B, 20C, 20D of the major control members 11C, 11D and the minor control members 11A, 11B may be arcuate or generally "C" shaped when viewed in profile or cross-section, best shown in FIG. 7B. In other embodiments other profiles or shapes may be employed such as chevron or "V" shaped.

Figure 2:
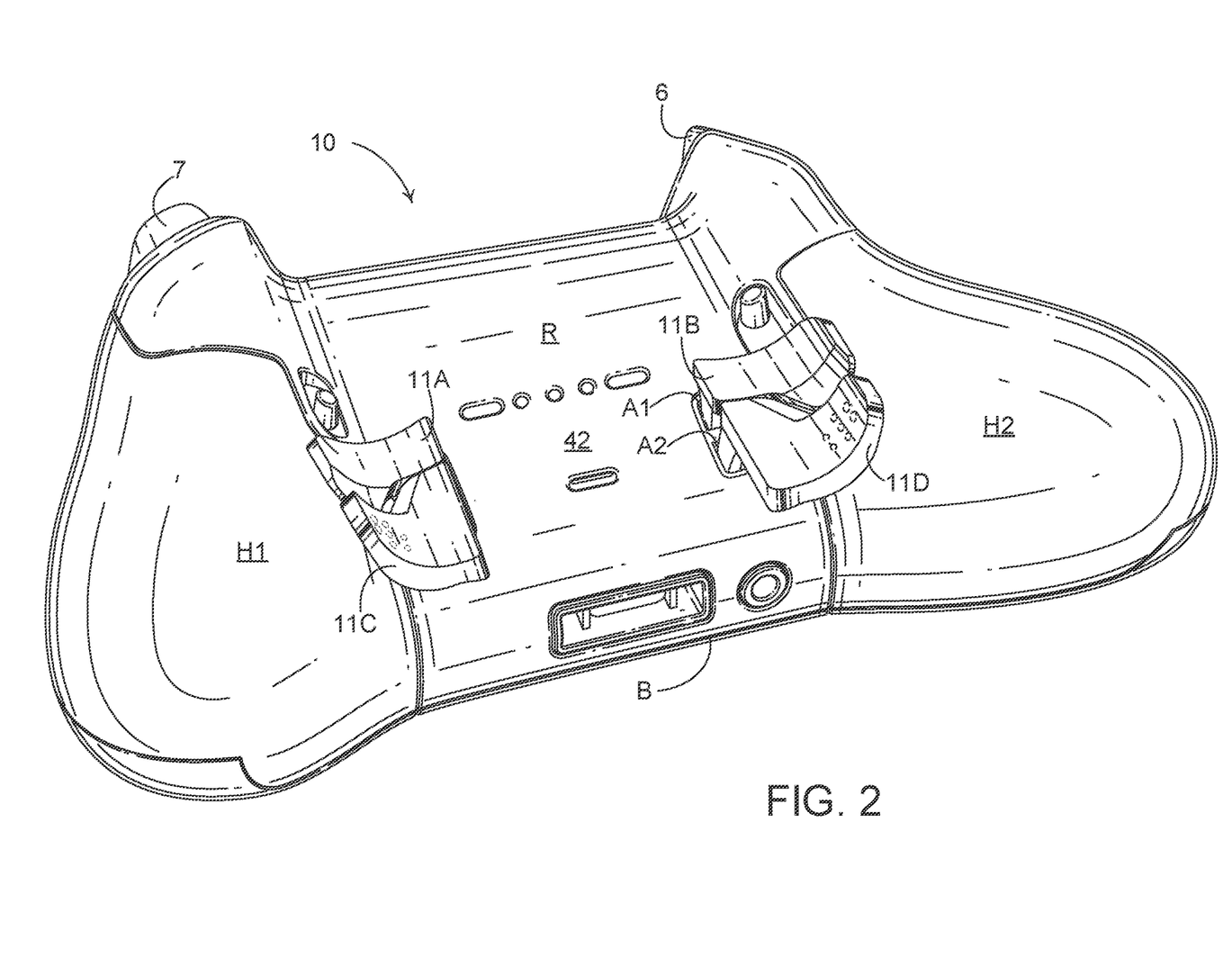
FIG. 2 is a perspective view of the back or rear of the input apparatus of FIG. 1B.

The control members 11A, 11B, 11C, 11D are arranged such that the position of the major and minor control members 11A, 11B, 11C, 11D can be reversed. In FIGS. 1B and 2 the major control members 11C, 11D are mounted to the rear body panel 42 in closest proximity to the bottom edge of the apparatus 10.

Figure 4:
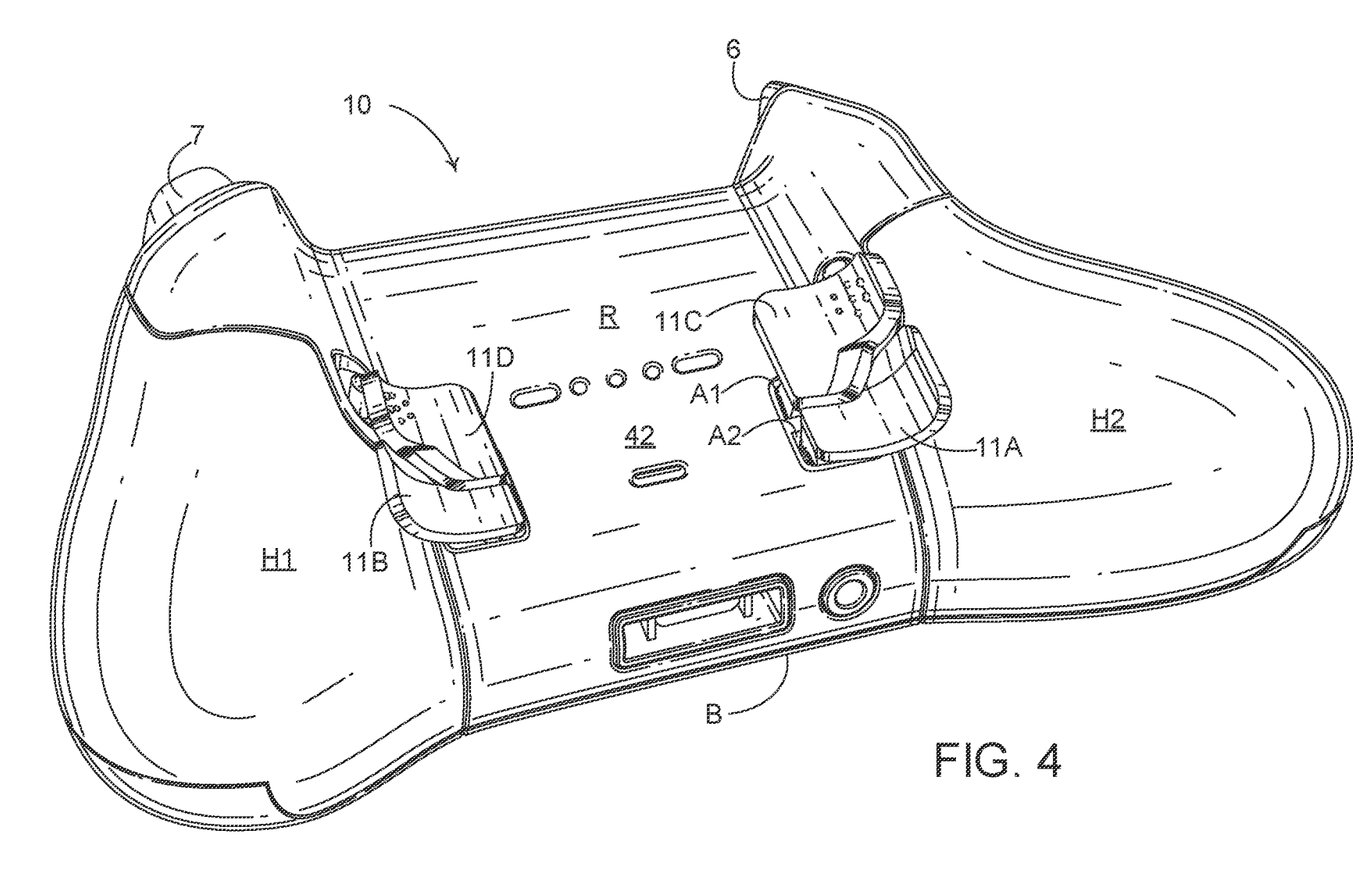
FIG. 4 is a perspective view of the back or rear of the input apparatus of FIG. 3A.

In FIGS. 3A and 4 the minor control members 11A, 11B are mounted to the rear body panel 42 in closest proximity to the bottom edge of the apparatus 10.

When in the configuration shown in FIG. 1B, the control members 11A, 11B, 11C, 11D are generally located closer to the bottom edge B of the apparatus 10 than when arranged in the configuration shown in FIG. 3A.

In the arrangement shown in FIG. 1B the major control members 11C, 11D may extend below or beyond the bottom edge B of the apparatus 10.

In the arrangement shown in FIG. 3A the minor control members 11A, 11B may be spaced apart from the bottom edge B of the apparatus 10.

Additionally, the apparatus 10 may comprises additional control member configurations, for example it is envisaged that four major control members 11C, 11D may be mounted to the apparatus 10, or alternatively four minor control members 11A, 11B. In these arrangements the forwardmost (closest to the top edge T) control member 11A, 11B, 11C, 11D on each side of the apparatus 10 is mounted in opposition to the rearmost (closest to the bottom edge B) control member 11A, 11B, 11C, 11D. It will be appreciated that other configurations comprising one, two, three or four control members 11A, 11B, 11C, 11D may be employed. For example but not limited to, the minor control members 11A, 11B may be mounted to a first side of the apparatus 10 in opposition (an edge E2A of a first one 11A of the minor control members 11A, 11B faces away from an edge E2B of a second one 11B of the minor control members 11A, 11B) to each other and the major control members 11C, 11D may be mounted to a second side of the apparatus 10 in opposition (an edge E1A of a first one 11V of the major control members 11C, 11D faces towards an edge E1B of a second one 11B of the major control members 11C, 11D) to each other.

One or more of control members 11A, 11B, 11C, 11D may comprise a textured surface for example in the illustrated embodiment raised nubs 24. The nubs 24 may facilitate identification of a particular the control member 11A, 11B, 11C, 11D; it may serve to distinguish between major and minor control members 11A, 11B, 11C, 11D—a different pattern or texture may be provided upon the minor control members 11A, 11B to that on the major control members 11C, 11D. Each control members 11A, 11B, 11C, 11D may comprises a unique pattern or texture. The nubs 24 may also increase grip or friction between the users finger and the control member 11A, 11B, 11C, 11D. It will be appreciated that other shapes, textures, embossments, ridge or grooves may be provided upon the control member 11A, 11B, 11C, 11D. In some embodiments the control members 11A, 11B, 11C, 11D may comprise a coating, paint or other surface treatment which increases friction or grip. The control members 11A, 11B, 11C, 11D may comprises an overmoulded or additional layer of material mounted thereto.

Figure 5A:
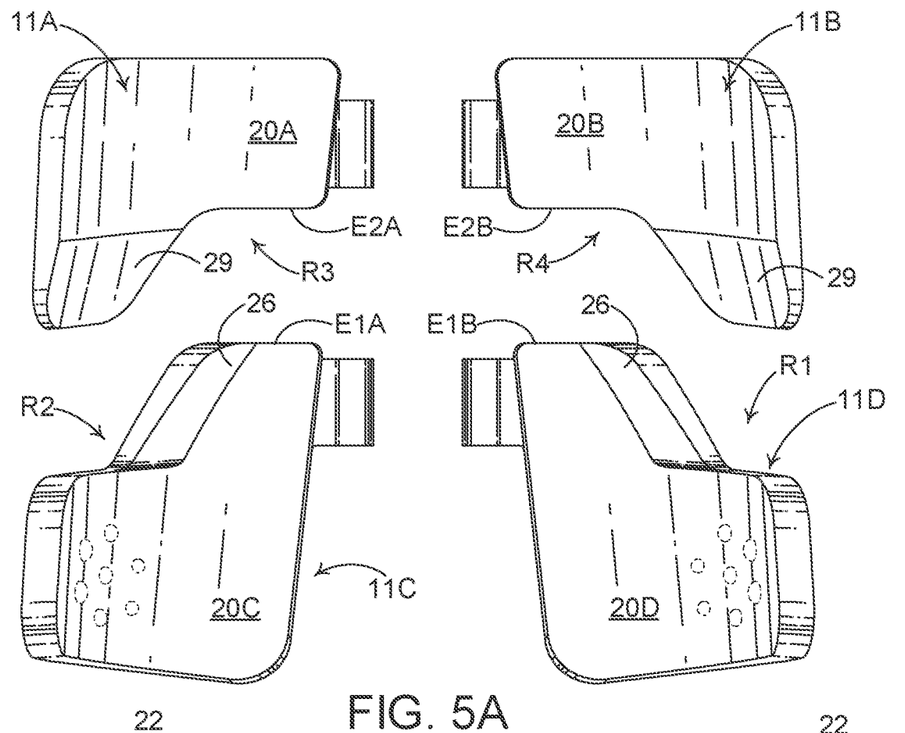
FIG. 5A shows plan views from below of additional control components for attachment to the rear of the input apparatus of FIGS. 1A to 3A.
Figure 5B:
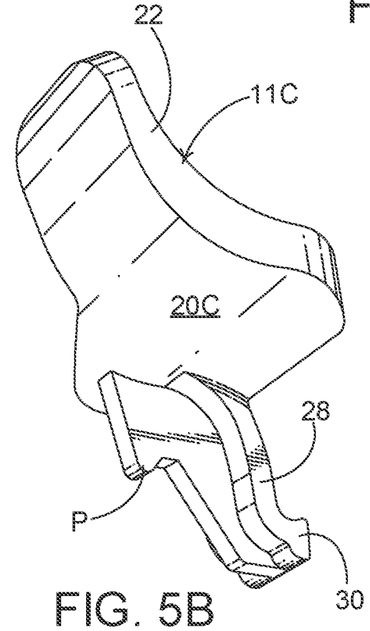
FIGS. 5B and 5C are alternative perspective views of the additional control components FIGS. 3A and 3B.
Figure 5C:
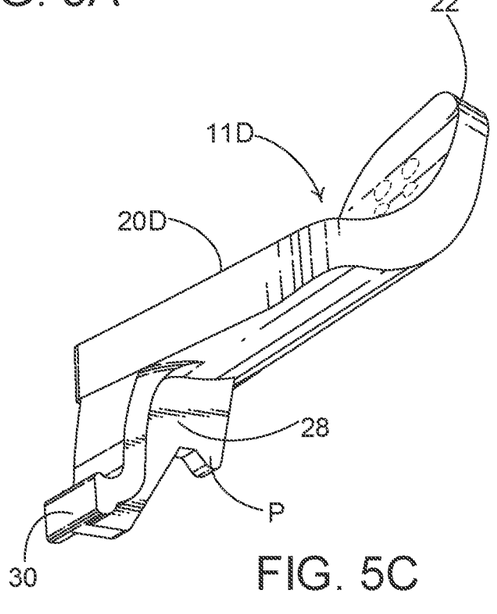
Figure 6A:
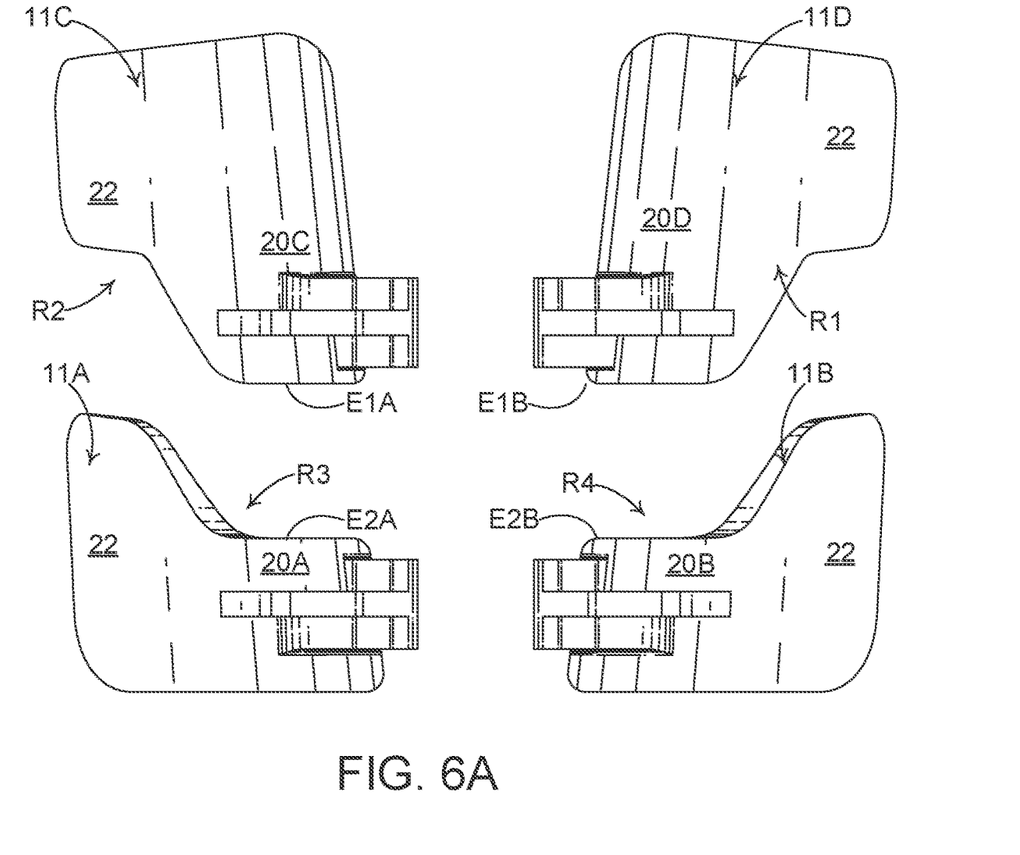
FIGS. 6A, 6B and 6C are side views of additional control components for attachment to the rear of the input apparatus of FIGS. 1A to 3A.
Figure 6B:
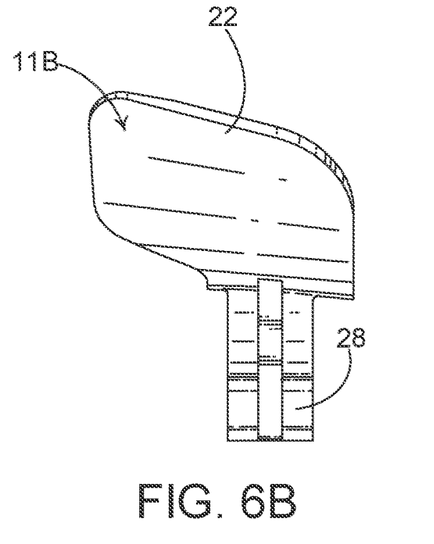
Figure 6C:
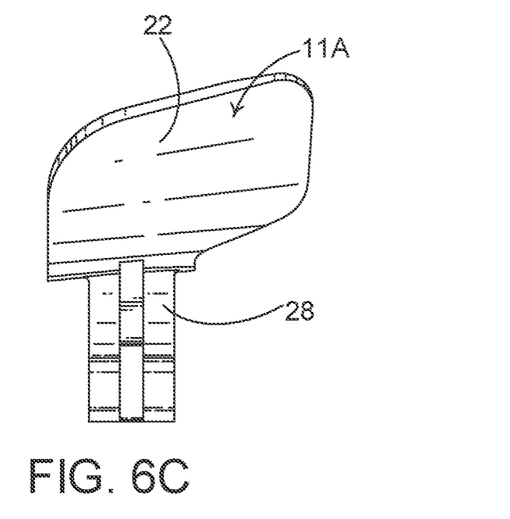

A base or inner surface, shown in FIGS. 5B and 5C may comprise a boss or protuberance P which extends therefrom. The protuberance P may be arranged to be aligned with a switch mechanism mounted in the apparatus 10. The switch mechanisms may be mounted in recessed or flush position so as to prevent or reduce the likelihood of unintentional activation when the control members 11A, 11B, 11C, 11D are removed from the apparatus 10.

The control members 11A, 11B, 11C, 11D may be resiliently biased, that is to say that they return to an unbiased or rest position when not under load for example when depressed by a user. The bias may be provided by a resilient biasing device, it may be provided by, or integrated, with a switch mechanism or it may be as a result of the inherent elasticity of the material from which the member is constructed. A user may displace or depress any of the control members 11A, 11B, 11C, 11D by engaging an outer surface thereof; such displacement causes a control members 11A, 11B, 11C, 11D to activate a switch mechanism mounted within the outer case of the apparatus 10. The control members 11A, 11B, 11C, 11D are mounted between the first handle portion H1 and the second handle portion H2 located on the base of the apparatus 10, and are disposed so as to be in close proximity to an outer surface of the controller body.

The control members 11A, 11B, 11C, 11D comprise an attachment mechanism. The attachment mechanism does not require any tools for the attachment of the control members 11A, 11B, 11C, 11D to the apparatus 10 or the removal of the control members 11A, 11B, 11C, 11D from the apparatus 10.

The attachment mechanism comprises a tongue or detent 30 provided on the leg 28 of the control member 11A, 11B, 11C, 11D. The attachment mechanism comprises an undercut (not shown) provided by the rear panel 42 of the apparatus 10.

The tongue 30 and portion of the leg are inserted through an aperture A1, A2 in the rear panel 42 of the apparatus 10. The tongue 30 is hooked or engaged with the undercut to inhibit removal.

The present disclosure provides an input apparatus for a computer or controller for a games console having one or more detachably mounted control members, the one or more control members comprising a first part of an attachment system for mating with a second parts of an attachment system provided on a panel forming a portion of an outer case of the controller. The one or more control members may comprise a major control member and a minor control member. The major control member and the minor control member are configured to nest or tessellate with each other. The major control member and the minor control member may overlap in a longitudinal direction of the apparatus. The major control member may comprise a first end edge and the minor control member may comprise a second end edge, the second end edge may be complementary in shape to the first end edge.

The input apparatus may comprise a plurality of mounting locations on the panel forming a portion of an outer case, each mounting location comprises a second part of the attachment system. The major control members may be mounted in any one of the plurality of mounting locations. The minor control member may be mounted in any one of the plurality of mounting locations.

The control members may be mounted to the input apparatus in pairs. A first one of the pair may be a major control member and a second one of the pair may be a minor control member.

A pair of control members may be mounted to the apparatus on a first side of a rear panel, adjacent to one of a pair of handles disposed on opposing sides of the rear panel in which the pair control members are in a first orientation. The pair of control members may be mounted to the apparatus on a second side of the rear panel, adjacent to the other one of the pair of handles in a second orientation, wherein the second orientation is inverted with respect to the first orientation.

Each control members comprises an outer surface or engaging surface with which a user interacts or engages. A portion referred to herein as a reduced interaction region of the outer surface of each control member may be shaped or configured to reduce the likelihood of user interaction, said portion of the surface is set back, curved or inclined so as to be closer to a rear panel of the apparatus. The reduced interaction region may mitigate against activation of the control member when an adjacent control member is depressed or activated.

It can be appreciated that various changes may be made within the scope of the present invention.

In some embodiments the microswitches may be replaced with a magnetic switch or sensor, for example a reed switch or hall sensor; the control members may comprise a magnet arranged so as to activate the magnetic switch or sensor when the control member is depressed by a user. It is envisaged that in such embodiments the magnetic switch or sensor is mounted inside the apparatus behind the rear panel and that there will be no requirement to provide apertures through the rear panel in order that the control members can physically contact the microswitches. Further it is envisaged that the user may be provided with feedback to indicate that the switch has been activated. The feedback may be aural or haptic, for example, such as an audible click.

It is envisaged that the controllers may be coupled to a games console or computer by a wired connection or by a wireless connection device.

It is also envisaged that the controller may be constructed as a shell or caddy into which a handheld electronic device such as, but not limited to, a mobile telephone (smartphone) or tablet computer is inserted, the caddy comprising control actuators, thumb sticks and/or buttons (which are coupled to the electronic device either wirelessly or via physical or wired connection) for interaction with or control of the electronic device.

It will be recognised that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. An input apparatus for a computer comprising:
   an outer case;
   at least one top control located at a top of the outer case, wherein the top control is configured to be operated by an index finger of a user; and
   at least one pair of detachably mounted control members, wherein:
      each of the pair of control members comprises a first part of an attachment system for mating with a second part of the attachment system provided on a panel forming a portion of the outer case of the apparatus;
      the pair of control members comprises a first control member comprising a first end edge and a second control member comprising a second end edge;
      the second end edge is complementary in shape to the first end edge;
      when the pair of control members is detachably mounted at a first mounting location on the outer case, the pair of control members is configured with the first end edge of the first control member adjacent to the second end edge of the second control member, and a portion of the first control member overlaps with the second control member in a longitudinal direction of the apparatus with the first control member located closer to the top of the outer case than the second control member; and
      when the pair of control members is detachably mounted at a second mounting location on the outer case, the pair of control members is configured with the first end edge of the first control member adjacent to the second end edge of the second control member, and a portion of the first control member overlaps with the second control member in a longitudinal direction of the apparatus with the second control member located closer to the top of the outer case than the first control member.

2. The input apparatus of claim 1, wherein the pair of control members comprises a major control member and a minor control member.

3. The input apparatus of claim 2, wherein a wing of the minor control member overlaps with the major control member in a longitudinal direction of the apparatus.

4. The input apparatus of claim 3, wherein the wing of the minor control member extends from a main body of the minor control member.

5. The input apparatus of claim 2, wherein the input apparatus comprises a plurality of mounting locations on the panel forming a portion of the outer case, each mounting location comprises the second part of the attachment system.

6. The input apparatus of claim 5, wherein the major control member is mountable in any one of the plurality of mounting locations.

7. The input apparatus of claim 5, wherein the minor control member is mountable in any one of the plurality of mounting locations.

8. The input apparatus of claim 1, wherein two or more pairs of control members are mounted to the input apparatus.

9. The input apparatus of claim 8, wherein each pair of control members comprises a major control member and a minor control member.

10. The input apparatus of claim 1, wherein the first mounting location comprises a first side of a rear panel, adjacent to one of a pair of handles disposed on opposing sides of the rear panel, in which the pair of control members are mounted in a first orientation.

11. The input apparatus of claim 10, wherein a first pair of control members is mountable to the apparatus on a second side of the rear panel, adjacent to the other one of the pair of handles in a second orientation, wherein the second orientation is inverted with respect to the first orientation.

12. The input apparatus of claim 10, wherein the second mounting location comprises a second side of the rear panel, adjacent to the other one of the pair of handles, and the at least one pair of control members comprises a second pair of control members mounted at the second mounting locations in a first orientation.

13. The input apparatus of claim 12, wherein the second pair of control members is mountable to the apparatus on the first side of the rear panel, the second pair of control members being in a second orientation, wherein the second orientation is inverted with respect to the first orientation.

14. The input apparatus of claim 1, wherein each control member comprises an outer surface with which a user interacts or engages, a portion of the outer surface provides a reduced interaction region of the outer surface of each control member is shaped and configured to reduce the likelihood of user interaction, said portion of the surface is set back with respect to an adjacent portion of the outer surface of the control member so as to be closer to a rear panel of the apparatus than the adjacent portion.

15. The input apparatus of claim 1, wherein the second part of the attachment system comprises openings in the outer case of the apparatus.

16. An input apparatus for a computer having two or more detachably mounted control members, each of the two or more control members comprising a first part of an attachment system for mating with a second part of an attachment system provided on a panel forming a portion of an outer case of the apparatus, the two or more control members comprising a major control member and a minor control member, wherein the major control member comprises a first end edge and the minor control member comprises a second end edge and the second end edge is complementary in shape to the first end edge, the apparatus comprising a pair of handles disposed on opposing sides of a rear panel, the major control member and the minor control member are configured to be mounted to the apparatus in a pair of configurations, the pair of configurations comprising:

a first configuration in which the major control member and the minor control member are detachably mounted to the apparatus on a first side of the rear panel, adjacent to a first one of the pair of handles, the major control member and the minor control member being in a first orientation with the first end edge of the major control member adjacent to the second end edge of the minor control member and the major control member overlaps with the minor control member in a longitudinal direction of the apparatus; and a second configuration in which the major control member and the minor control member are detachably mounted to the apparatus on a second side of the rear panel, adjacent to the other one of the pair of handles in a second orientation with the first end edge of the major control member adjacent to the second end edge of the minor control member and the major control member overlaps with the minor control member in a longitudinal direction of the apparatus, wherein the second orientation is inverted with respect to the first orientation.

17. The input apparatus of claim 16, wherein the major control member and the minor control member are configured to tessellate with each other such that a portion of the major control member overlaps in a longitudinal direction with the minor control member.

18. An input apparatus of claim 16, wherein a wing of the major control member overlaps with the minor control member in a longitudinal direction of the apparatus.

19. The input apparatus of claim 16, wherein the second part of the attachment system comprises openings in the panel forming the portion of the outer case of the apparatus.

\* \* \* \* \*